United States Patent
Matsushima

(10) Patent No.: US 10,110,129 B2
(45) Date of Patent: Oct. 23, 2018

(54) SWITCHING CONTROL CIRCUIT, SWITCHING POWER SUPPLY DEVICE AND ELECTRONIC APPARATUS

(71) Applicant: Rohm Co., Ltd., Kyoto (JP)

(72) Inventor: Shinsuke Matsushima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/666,830

(22) Filed: Aug. 2, 2017

(65) Prior Publication Data

US 2018/0041123 A1    Feb. 8, 2018

(30) Foreign Application Priority Data

Aug. 3, 2016   (JP) ................................. 2016-152876

(51) Int. Cl.
  *H02M 3/158* (2006.01)
  *H02M 1/08* (2006.01)

(52) U.S. Cl.
  CPC ............. *H02M 3/158* (2013.01); *H02M 1/08* (2013.01)

(58) Field of Classification Search
  CPC .... H02M 3/156; H02M 3/1588; H02M 3/155; H02M 3/1582; H02M 3/157; H02M 3/158
  USPC .......................... 323/282, 283, 284, 285, 351
  See application file for complete search history.

(56) References Cited

U.S. PATENT DOCUMENTS

| | | | | |
|---|---|---|---|---|
| 7,679,341 B2 * | 3/2010 | Chen | ................... | H02M 3/1588 323/224 |
| 9,815,401 B2 * | 11/2017 | Nagao | ...................... | B60Q 3/14 |
| 9,819,895 B2 * | 11/2017 | Tateishi | ................... | H04N 5/63 |
| 9,847,779 B2 * | 12/2017 | Kadowaki | ............ | H03K 5/1515 |
| 9,876,426 B2 * | 1/2018 | Tateishi | ................ | H02M 3/158 |
| 9,882,484 B2 * | 1/2018 | Fukumoto | ............. | H02M 3/158 |
| 2008/0203990 A1 * | 8/2008 | Nishida | ............... | H02M 3/1582 323/284 |
| 2008/0290854 A1 * | 11/2008 | Uchiike | .............. | H02M 3/1588 323/284 |
| 2009/0295350 A1 * | 12/2009 | Yamada | .............. | H02M 3/1588 323/282 |

(Continued)

FOREIGN PATENT DOCUMENTS

JP        10-080134        3/1998

*Primary Examiner* — Adolf Berhane
(74) *Attorney, Agent, or Firm* — Fish & Richardson P.C.

(57) ABSTRACT

A switching control circuit includes: a feedback control part that turns on/off an output switch element so that an output voltage of a switching output circuit becomes to be a target value; a synchronous control part that turns on/off a synchronous rectification element; and a reverse current detection part that detects a reverse current during a turning-on period of the synchronous rectification element, wherein the synchronous control part has operation modes including: an asynchronous mode in which the synchronous rectification element is always turned off; and a synchronous mode in which the synchronous rectification element is turned on when the output switch element is turned off, and is turned off when the reverse current reaches a predetermined reverse current detection level, and wherein the reverse current detection level is gradually raised when the synchronous control part is switched from the asynchronous mode to the synchronous mode.

9 Claims, 12 Drawing Sheets

(56) References Cited

U.S. PATENT DOCUMENTS

| | | | |
|---|---|---|---|
| 2010/0026256 A1* | 2/2010 | Liu | H02M 3/158 |
| | | | 323/282 |
| 2010/0264891 A1* | 10/2010 | Lee | H02M 3/158 |
| | | | 323/282 |
| 2011/0157919 A1* | 6/2011 | Yedevelly | H02M 3/33507 |
| | | | 363/20 |
| 2013/0063078 A1* | 3/2013 | Nishida | H02J 7/0034 |
| | | | 320/107 |
| 2014/0146238 A1* | 5/2014 | Murakami | H02M 3/1563 |
| | | | 348/730 |
| 2015/0326102 A1* | 11/2015 | Radhakrishnan | H02M 1/00 |
| | | | 323/271 |

* cited by examiner

SWITCHING CONTROL CIRCUIT, SWITCHING POWER SUPPLY DEVICE AND ELECTRONIC APPARATUS

CROSS-REFERENCE TO RELATED APPLICATION

This application is based upon and claims the benefit of priority from Japanese Patent Application No. 2016-152876, filed on Aug. 3, 2016, the entire contents of which are incorporated herein by reference.

TECHNICAL FIELD

The present disclosure relates to a switching control circuit, a switching power supply device and an electronic apparatus including the same.

BACKGROUND

An asynchronous rectification type switching power supply device X (of a step-up type shown in FIG. 15) has been conventionally used as a power supply device for various applications.

However, such an asynchronous rectification type switching power supply device X does not have the sink current capability (the capability of autonomously extracting electric charges of an output capacitor CX) on its circuit configuration. Therefore, when an output voltage Vo is to be gradually decreased within a predetermined time, it is necessary to provide a separate discharging circuit, which causes a problem of an output ripple (see FIG. 16) or heat generation at the time of the operation of the discharging circuit.

This problem is not limited to the asynchronous rectification type switching power supply device but may be applied to a synchronous rectification type switching power supply device with a light load mode (a function being operated in a discontinuous current mode by cutting off a reverse current in the case of a light load).

SUMMARY

Some embodiments of the present disclosure provide a switching control circuit capable of obtaining the sink current capability without requiring a separate discharging circuit, a switching power supply device and an electronic apparatus including the same.

According to one embodiment of the present disclosure, there is provided a switching control circuit including: a feedback control part configured to turn on and turn off an output switch element of a switching output circuit so that an output voltage of the switching output circuit becomes to be a target value; a synchronous control part configured to turn on and turn off a synchronous rectification element connected in parallel to an asynchronous rectification element of the switching output circuit; and a reverse current detection part configured to detect whether or not a reverse current flowing during a turning-on period of the synchronous rectification element reaches a predetermined reverse current detection level (first configuration). The synchronous control part has operation modes including: an asynchronous mode in which the synchronous rectification element is always turned off; and a synchronous mode in which the synchronous rectification element is turned on when the output switch element is turned off, and is turned off when the reverse current reaches the reverse current detection level. The reverse current detection level is gradually raised from a first level to a second level when the synchronous control part is switched from the asynchronous mode to the synchronous mode.

According to another embodiment of the present disclosure, there is provided a switching control circuit including: a feedback control part configured to turn on and turn off an output switch element and a synchronous rectification element of a switching output circuit in a complementary manner so that an output voltage of the switching output circuit becomes to be a target value; and a reverse current detection part configured to detect whether or not a reverse current flowing during a turning-on period of the synchronous rectification element reaches a predetermined reverse current detection level (second configuration). The feedback control part has a light load mode in which the synchronous rectification element is forcedly turned off when the reverse current reaches the reverse current detection level. The reverse current detection level is gradually raised from a first level to a second level when the feedback control part is switched from the light load mode to a mode in which the output switch element and the synchronous rectification element are turned on and turned off in a complementary manner.

In the switching control circuit of the first or second configuration, after a completion of raising the reverse current detection level, the reverse current detection level may be gradually lowered from the second level to the first level (third configuration).

In the switching control circuit of the first or second configuration, after a completion of raising the reverse current detection level, the reverse current detection level may be rapidly lowered from the second level to the first level (fourth configuration).

In the switching control circuit of any one of the first to fourth configurations, the reverse current detection part may detect whether or not the reverse current reaches the reverse current detection level by comparing one of a sense voltage, which is obtained by a current-voltage conversion of the reverse current during the turning-on period of the synchronous rectification element, and a switch voltage appearing on a connection node between the output switch element and the synchronous rectification element with a predetermined reverse current detection voltage (fifth configuration).

In the switching control circuit of the fifth configuration, the reverse current detection part may include: a capacitor; a charging part that charges the capacitor; a discharging part that discharges the capacitor; a voltage/current conversion part that generates a slope current from a charging voltage of the capacitor; a current/voltage conversion part that generates the reverse current detection voltage from the slope current; and a comparator that compares the sense voltage or the switch voltage with the reverse current detection voltage to generate a reverse current detection signal (sixth configuration).

In the switching control circuit of any one of the first to sixth configurations, the feedback control part may control driving of the switching output circuit by voltage mode control, current mode control, or hysteresis control (seventh configuration).

According to another embodiment of the present disclosure, there is provided a switching power supply device including: a switching output circuit configured to generate an output voltage from an input voltage; a switching control circuit of any one of the first to seventh configurations, which is configured to control driving of the switching output circuit; and a logic circuit configured to output a signal for setting a target value of the output voltage to the switching control circuit (eighth configuration).

In the switching control circuit of the eighth configuration, the switching output circuit is of a step-up type, a step-down type, or a step-up/step-down type (ninth configuration).

According to another embodiment of the present disclosure, there is provided an electronic apparatus including: a switching power supply device of the eighth or ninth configuration; and a load configured to be operated with a power supplied from the switching power supply device (tenth configuration).

DETAILED DESCRIPTION

<Switching Power Supply Device>

Figure 1:
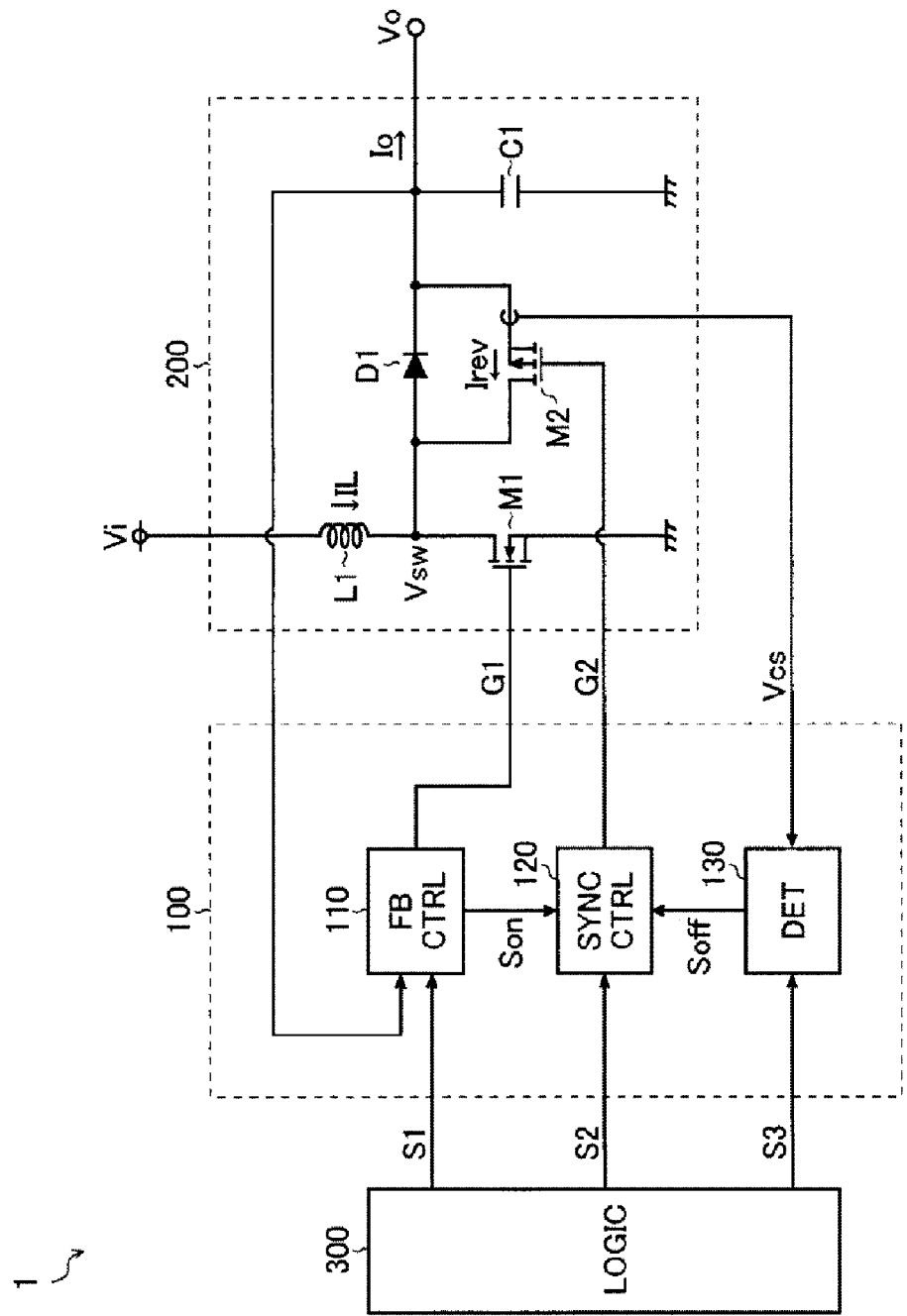
FIG. 1 is a circuit block diagram showing a configuration example of a switching power supply device.

FIG. 1 is a circuit block diagram showing a configuration example of a switching power supply device. The switching power supply device 1 of this configuration example includes a switching control circuit 100, a switching output circuit 200, and a logic circuit 300. The switching power supply device 1 can be mounted on various electronic devices, together with a load which is capable of being operated with the power received from the switching power supply device 1.

The switching control circuit 100 receives various control signals (a reference voltage setting signal S1, a mode switching signal S2, and a reverse current detection level switching signal S3 in FIG. 1) of the logic circuit 300 and various feedback signals (an output voltage Vo and a sense voltage Vcs in FIG. 1) of the switching output circuit 200 and generates gate signals G1 and G2 for controlling driving of the switching output circuit 200. The switching control circuit 100 may be integrated as a so-called power control IC in a semiconductor device.

The switching output circuit 200 is a step-up switching output stage that generates the output voltage Vo from an input voltage Vi and supplies it to a load (not shown) (for example, an analog circuit supplied with the output voltage Vo as an analog power supply voltage AVDD), and includes an N-channel type MOS (Metal Oxide semiconductor) field effect transistor M1 (corresponding to an output switch element), a P-channel type MOS field effect transistor M2 (corresponding to a synchronous rectification element), a diode D1. (corresponding to an asynchronous rectification element), an inductor L1, and an output capacitor C1.

The inductor L1 has a first end connected to an input terminal of the input voltage Vi and a second end connected to the drains of the transistors M1 and M2 and the anode of the diode D1. The source and back gate of the transistor M1 are connected to the ground terminal. The gate signal G1 is input to the gate of the transistor M1. The source and back gate of the transistor M2 and the cathode of the diode D1 are connected to an output terminal of the output voltage Vo. The gate signal G2 is input to the gate of the transistor M2. The output capacitor C1 is connected between the output terminal of the output voltage Vo and the ground terminal.

The transistor M1 is turned on when the gate signal G1 is at a high level, and is turned off when the gate signal G1 is at a low level. On the other hand, the transistor M2 is turned on when the gate signal G2 is at a low level, and is turned off when the gate signal G2 is at a high level. These transistors M1 and M2 may be integrated in a semiconductor device, together with the switching control circuit 100, or may be externally attached to the semiconductor device as discrete components.

In this way, the switching output circuit 200 of this configuration example includes the diode D1 and the transistor M2 connected in parallel as its rectification elements and is controlled to be driven in either an asynchronous mode or a synchronous mode (details of which will be described later).

The logic circuit 300 generates the reference voltage setting signal S1, the mode switching signal S2, and the reverse current detection level switching signal S3, and outputs them to the switching control circuit 100. The reference voltage setting signal S1 is a digital signal for setting a target value (corresponding to a voltage value of a reference voltage Vref to be described later) of the output voltage Vo. The mode switching signal S2 is a digital signal for switching between the asynchronous mode and the synchronous mode (details of which will be described later). The reverse current detection level switching signal S3 is a digital signal for indicating a switching timing or a set value of a reverse current detection level (details of which will be described later).

<Switching Control Circuit>

Subsequently, the internal configuration of the switching control circuit 100 will be described in detail with reference to FIG. 1. The switching control circuit 100 of this configuration example includes a feedback control part 110, a synchronous control part 120, and a reverse current detection part 130.

The feedback control part 110 generates the gate signal G1 so that the output voltage Vo becomes the target value, and turns on/off the transistor M1. More specifically, the feedback control part 110 generates the gate signal G1 so that the output voltage Vo (or a corresponding feedback voltage Vfb) becomes the reference voltage Vref. That is to say, as the reference voltage Vref becomes higher, the target value of the output voltage Vo becomes higher. Conversely, as the reference voltage Vref becomes lower, the target value of the output voltage Vo becomes lower. The reference voltage Vref can be set to an arbitrary voltage value according to the reference voltage setting signal S1 input from the logic circuit 300.

The synchronous control part 120 has two types of operation modes, i.e., an asynchronous mode and a synchronous mode, and is switched to one of the operation modes in accordance with the mode switching signal S2 input from the logic circuit 300. The asynchronous mode is an operation mode in which the transistor M2 is always turned off irrespective of the turning-on/off of the transistor M1. On the other hand, the synchronous mode is an operation mode in which the transistor M2 is turned on when the transistor M1 is turned off, and is turned off when a reverse current Irev (a current flowing from the output capacitor C1 to the transistor M2) flowing during the turning-on period of the transistor M2 reaches a predetermined reverse current detection level.

In the synchronous mode, the turning-on timing of the transistor M2 may be determined according to, for example, a turning-on timing signal Son (a pulse signal whose logic level is switched when the transistor M1 is turned off) input from the feedback control part 110. The gate signal G1 or an internal signal of the feedback control part 110 (such as a reset signal Sb, a pulse width modulation signal Sc, or an inverted pulse width modulation signal ScB in FIG. 11 to be described later) can be used as the turning-on timing signal Son. On the other hand, the turn-off timing of the transistor M2 may be determined according to, for example, a turn-off timing signal Soff (a pulse signal whose logic level is switched when the reverse current Irev reaches the reverse current detection level) input from the reverse current detection part 130.

During the turning-on period of the transistor M2, the reverse current detection part 130 compares the sense voltage Vcs obtained by current-voltage conversion of the reverse current Irev with a reverse current detection voltage Vth to thereby detect whether or not the reverse current Irev reaches the reverse current detection level, and generates the turning-off timing signal Soff (a reverse current detection signal) based on a result of the detection. The reverse current detection voltage Vth varies between a first voltage value and a second voltage value VthL (<VthH) in accordance with the reverse current detection level switching signal S3 input from the logic circuit 300, the technical significance of which will be described later.

<Basic Operation>

Next, the basic operation (a step-up operation in a continuous current mode) of the switching power supply device 1 will be described. When the feedback control part 110 turns on the transistor M1, an inductor current IL flows through the inductor L1 toward the ground terminal via the transistor M1. At this time, since a switch voltage Vsw appearing on the anode of the diode D1 drops to almost the ground voltage via the transistor M1, the diode D1 is reverse-biased. In addition, when the transistor M1 is turned on, the transistor M2 is turned off regardless of whether the synchronous control part 120 is in the asynchronous mode or the synchronous mode. Therefore, no current flows from the output capacitor C1 into the transistor M1.

On the other hand, when the feedback control part 110 turns off the transistor M1, the inductor L1 tries to keep flowing the inductor current IL in the same direction as before. At this time, if the synchronous control part 120 is in the asynchronous mode, the diode D1 is forward-biased and, when the synchronous control part 120 is in the synchronous mode, the transistor M1 is turned on. Therefore, the inductor current IL flows from the output terminal of the output voltage Vo into a load (not shown), as an output current Io, and also flows into the ground terminal via the output capacitor C1 while charging the output capacitor C1.

The above operation is repeated to supply the output voltage Vo obtained by stepping-up the input voltage Vi to the load (not shown).

<Mode Switching Function>

In the switching power supply device 1 having the above configuration, when lowering a digital value of the reference voltage setting signal S1, the logic circuit 300 switches the mode switching signal S2 from a logic level (for example, high level) at the time of selecting the asynchronous mode to a logic level (for example, low level) at the time of selecting the synchronous mode. That is to say, when the target value of the output voltage Vo is lowered, the synchronous control part 120 can be switched from the asynchronous mode to the synchronous mode. The significance of introducing this mode switching function will be described below.

In the synchronous mode, even if the stored energy of the inductor L1 becomes poor during the turning-on period of the transistor M2 (or during the turning-off period of the transistor M1) and the reverse current Irev begins to flow from the output capacitor C1 toward the transistor M2, the transistor M2 will not be turned off until the current value of the reverse current Irev reaches a predetermined reverse current detection level. Therefore, in the synchronous mode, electric charges can be extracted from the output capacitor C1 by the amount of the reverse current Irev during the period from the start of the flowing of the reverse current trey to the turning-off of the transistor M2.

In this way, by introducing the synchronous mode, it is possible to obtain the sink current capability equivalent to the reverse current Irev without requiring a separate discharge circuit. Therefore, by switching from the asynchronous mode to the synchronous mode in accordance with the reduction of the target value of the output voltage Vo, it becomes possible to autonomously lower the output voltage Vo.

On the other hand, since the synchronous control part 120 is kept to be in the asynchronous mode except when the target value of the output voltage Vo is lowered, the transistor M2 is basically kept turned off That is to say, the transistor M2 does not steadily function as a synchronous rectification element, but is temporarily turned on only when extracting the electric charges from the output capacitor C1. Therefore, since the transistor M2 does not require such large current capability, a PMOSFET having smaller current capability than an NMOSFET having larger current capability may be used as the transistor M2. Unlike the NMOSFET, the PMOSFET can be driven without using a bootstrap, so that circuit elements are added at minimum.

<Reverse Current Detection Level Switching Function>

In the switching power supply device 1 having the above configuration, when lowering the digital value of the reference voltage setting signal S1, the logic circuit 300 generates the reverse current detection level switching signal S3 so that the reverse current detection level is gradually increased from a first level to a second level. The significance of introducing this reverse current detection level switching function will be described below.

Figure 2:
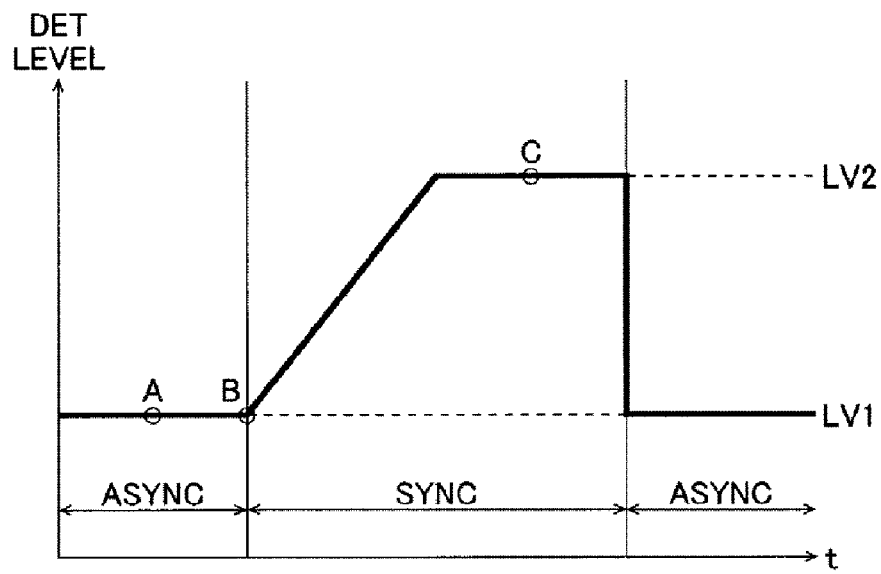
FIG. 2 is a schematic view showing a first change pattern of a reverse current detection level.

FIG. 2 is a schematic view showing a first change pattern of the reverse current detection level. In FIG. 2, the vertical axis represents a reverse current detection level and the horizontal axis represents time. As described above, when the target value of the output voltage Vo is lowered, the synchronous control part 120 is switched from the asynchronous mode (ASYNC) to the synchronous mode (SYNC). At this time, in the reverse current detection part 130, the reverse current detection level is gradually increased from the first level LV1 to the second level LV2 (where LV2>LV1).

Figure 3:
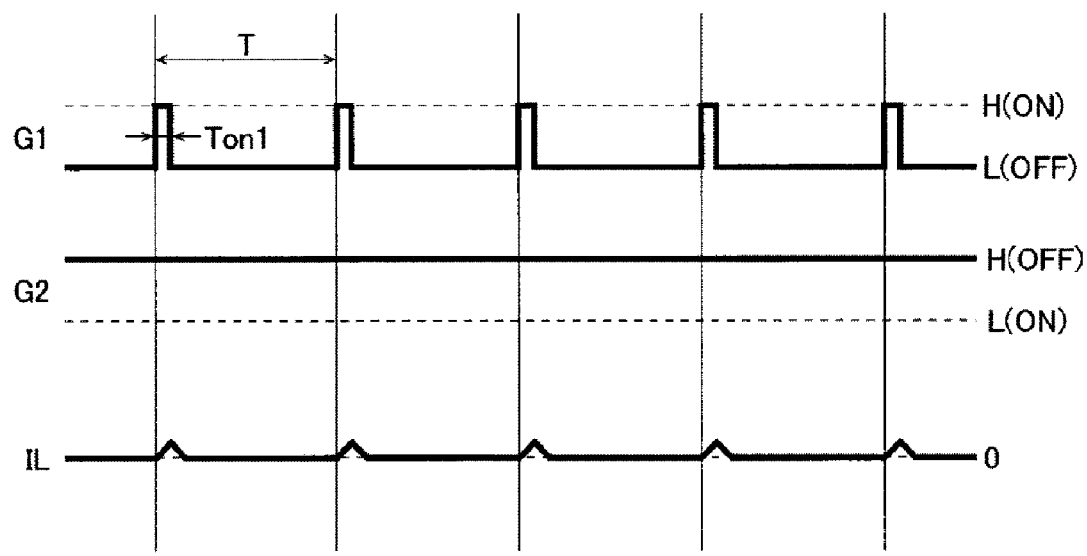
FIG. 3 is a timing chart (point A) showing behaviors of a gate signal and an inductor current.
Figure 4:
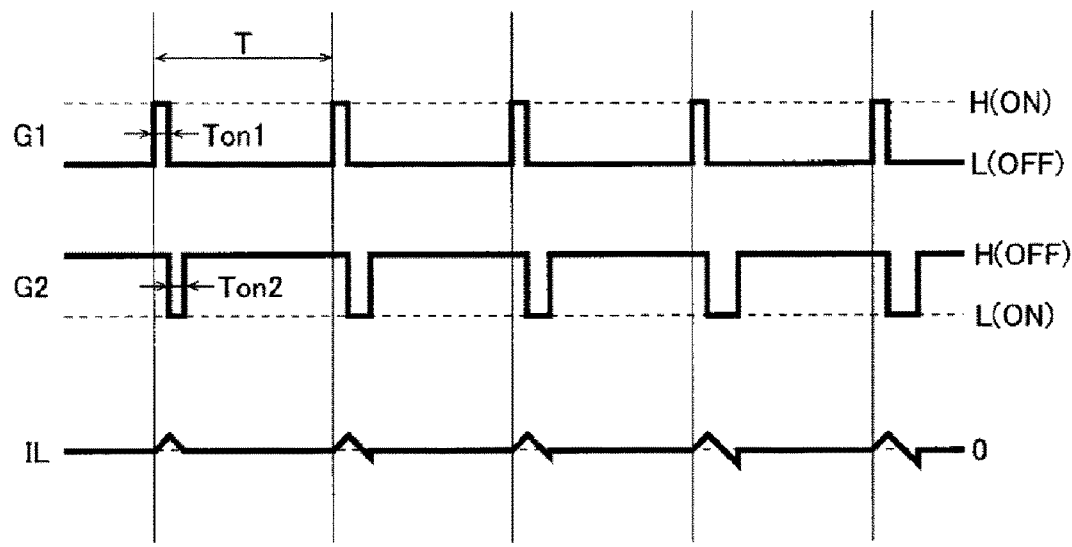
FIG. 4 is a timing chart (point B) showing behaviors of a gate signal and an inductor current.
Figure 5:
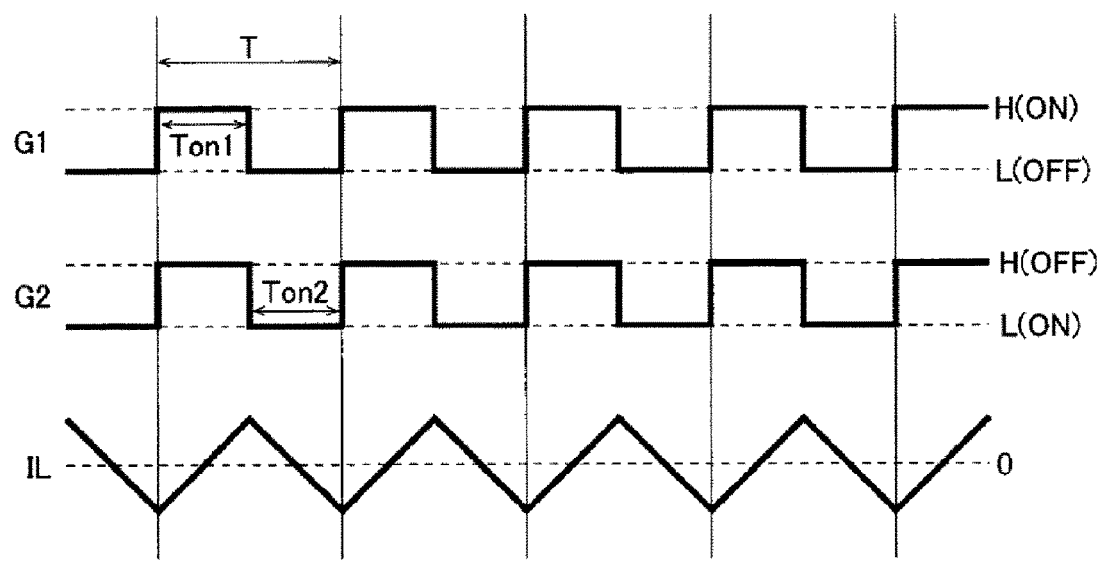
FIG. 5 is a timing chart (point C) showing behaviors of a gate signal and an inductor current.

FIGS. 3 to 5 are timing charts showing behaviors of the gate signals G1 and G2 and the inductor current IL at points A to C in FIG. 2, respectively. Point A indicates a point in time when the synchronous control part 120 is set to the asynchronous mode (ASYNC), point B indicates a point in time immediately after the synchronous control part 120 is switched from the asynchronous mode (ASYNC) to the synchronous mode (SYNC), and point C indicates a point in time after the reverse current detection level reaches the second level LV2 in the synchronous mode (SYNC).

As shown in FIG. 3, at the time point (point A) when the synchronous control part 120 is set to the asynchronous mode (ASYNC), the transistor M1 is turned on/off while the transistor M2 is kept turned off. In a load state (a light load state or a no-load state) in which the required supply of the output current Io can be covered only by the charges stored in the output capacitor C1, it is sufficient to charge the output capacitor C1 by the amount of reduction of the charges. As a result, the on-duty (Ton1/T) of the transistor M1 decreases and the inductor current IL enters a discontinuous current mode.

On the other hand, as shown in FIG. 4, at the time point (point B) immediately after the synchronous control part 120 is switched from the asynchronous mode (ASYNC) to the synchronous mode (SYNC), the transistor M2 is turned on when the transistor M1 is turned off, and is turned off when the reverse current Irev reaches the reverse current detection level. At this time, the reverse current detection level is gradually increased from the first level LV1 to the second level LV2. Therefore, the turning-on period Tong of the transistor M2 gradually becomes longer as the reverse current detection level rises. The turning-on period Ton1 of the transistor M1 is feedback-controlled so that the output voltage Vo becomes the target value. This aspect has no difference between the asynchronous mode (ASYNC) and the synchronous mode (SYNC).

As shown in FIG. 5, in the synchronous mode (SYNC), at the time point (point C) after the reverse current detection level reaches the second level LV2, the transistors M1 and M2 are turned on/off in a complementary manner at a duty D (=(Vo−Vi)/Vo) according to an input/output ratio. For example, when the input voltage Vi is 12 V and the output voltage Vo is 24 V, the duty D becomes 50%. In FIG. 5, it is assumed that the light load state or the no-load state as described above is maintained also in the synchronous mode (SYNC). That is to say, in the turning-on period Ton2 of the transistor M2, a positive inductor current IL flowing from the transistor M2 toward the output capacitor C1 is approximately equal to a negative inductor current IL (the reverse current Irev) flowing from the output capacitor C1 toward the transistor M2 and almost all of the electric charges stored in the output capacitor C1 are discharged by the reverse current Irev.

Figure 6:
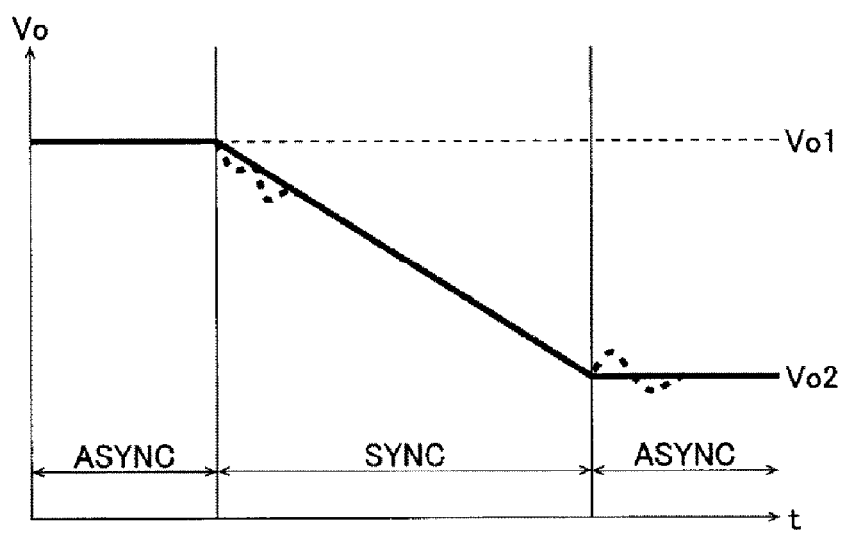
FIG. 6 is an output waveform diagram in the suggested method.

As described above with reference to FIGS. 2 to 5, in the synchronous mode (SYNC), when the reverse current detection level is initially kept low and is gradually increased over time, the sink current capability can be limited by utilizing the reverse current detection function. Therefore, since it is possible to prevent the occurrence of an excessive reverse current Irev at the time of switching to the synchronous mode (SYNC), even if the output voltage Vo is gradually decreased in a certain time, an output ripple can be effectively reduced (see FIG. 6). In addition, since no separate discharge circuit is required, heat generation can be suppressed.

Figure 7:
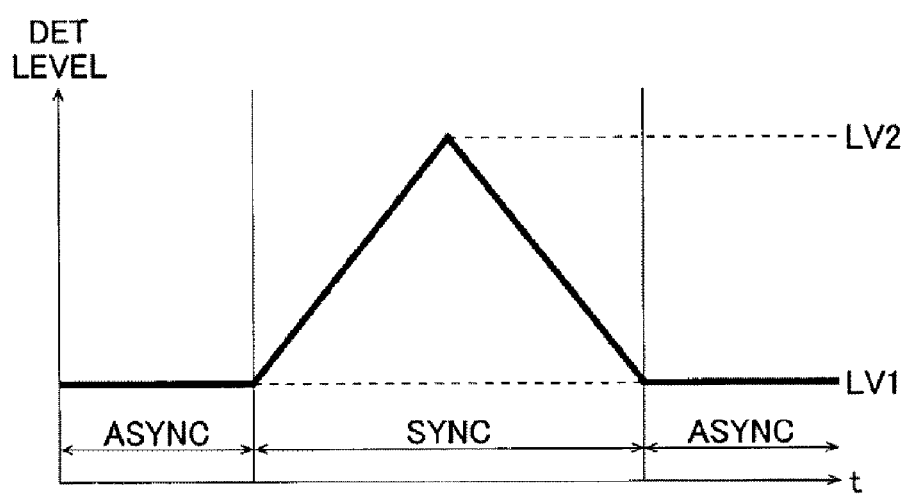
FIG. 7 is a schematic view showing a second change pattern of the reverse current detection level.

The reverse current detection level may be lowered from the second level LV2 to the first level LV1 at an appropriate timing after completion of the raising. In this case, when the light load state or the no-load state is eliminated, there is no particular problem even if the reverse current detection level is rapidly reduced from the second level LV2 to the first level LV1 as shown in FIG. 2. On the other hand, when the light load state or the no-load state is continuing, in order to suppress the output ripple, it is desirable to use the method of gradually lowering the reverse current detection level from the second level LV2 to the first level LV1, as shown in FIG. 7.

<Reverse Current Detection Part>

Figure 8:
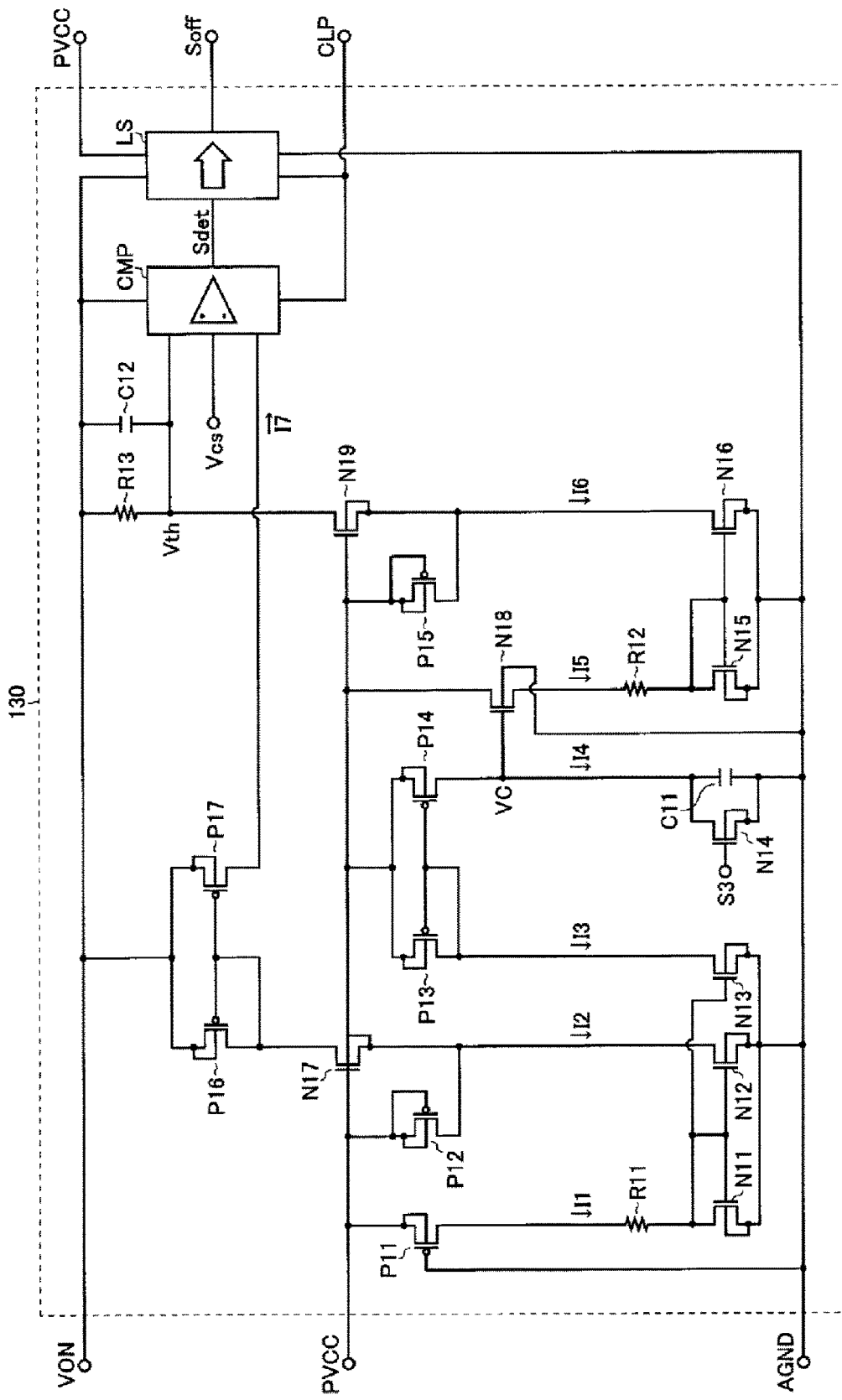
FIG. 8 is a circuit block diagram showing a configuration example of a reverse current detection part.

FIG. 8 is a circuit block diagram showing a configuration example of the reverse current detection part 130. The reverse current detection part 130 of this configuration example includes N-channel type MOS field effect transistors N11 to N19, P-channel type MOS field effect transistors P11 to P17, resistors R11 to R13, capacitors C11 and C12, a comparator CMP, and a level shifter LS.

The source and back gate of the transistor P11 are connected to a first power supply terminal PVCC. The drain of the transistor P11 is connected to the first end of the resistor R11. The gate of the transistor P11 is connected to the ground terminal AGND. The second end of the resistor R11 is connected to the drain of the transistor N11.

The source, back gate and gate of the transistor P12 are connected to the first power supply terminal PVCC. The drain of the transistor P12 is connected to the drain of the transistor N12. The gates of the transistors N11 to N13 are connected to the drain of the transistor N11. The sources and back gates of the transistors N11 to N13 are connected to the ground terminal AGND.

The drain of the transistor N13 is connected to the drain of the transistor P13. The sources and back gates of the transistors P13 and P14 are connected to the first power supply terminal PVCC. The gates of the transistors P13 and P14 are connected to the drain of the transistor P13.

The first end of the capacitor C11 and the drain of the transistor N14 are connected to the drain of the transistor P14. The second end of the capacitor C11 and the source and back gate of the transistor N14 are connected to the ground terminal AGND. The gate of the transistor N14 is connected to the application terminal of the reverse current detection level switching signal S3.

The drain of the transistor N18 is connected to the first power supply terminal PVCC. The gate of the transistor N18 is connected to the first end (the application terminal of a charging voltage VC) of the capacitor C11. The back gate of the transistor N18 is connected to the ground terminal AGND. The source of the transistor N18 is connected to the first end of the resistor R12. The second end of the resistor R12 is connected to the drain of the transistor N15.

The gates of the transistors N15 and N16 are connected to the drain of the transistor N15. The sources and back gates of the transistors N15 and N16 are connected to the ground terminal AGND. The source, back gate and gate of the transistor P15 are connected to the first power supply terminal PVCC. The drain of the transistor P15 is connected to the drain of the transistor N16.

The gate of the transistor N17 is connected to the first power supply terminal PVCC. The source and back gate of the transistor N17 are connected to the drain of the transistor N17. The drain of the transistor N17 is connected to the drain of the transistor P16. The gates of the transistors P16 and P17 are connected to the drain of the transistor P16. The sources and back gates of the transistors P16 and P17 are connected to the second power supply terminal VON. The transistor P17 is connected to the driving current input terminal of the comparator CMP.

The gate of the transistor N19 is connected to the first power supply terminal PVCC. The source and back gate of the transistor N19 are connected to the drain of the transistor N16. The drain of the transistor N19 (the application terminal of the reverse current detection voltage Vth) is connected to the non-inverting input terminal (+) of the comparator CMP. The first end of the resistor R13 and the first end of the capacitor C12 are connected to the second power supply terminal VON. The second end of the resistor R13 and the second end of the capacitor C12 are connected to the drain of the transistor N19.

Among the above components, the transistor P11 and the resistor R11 function as a constant current source that generates a predetermined constant current I1. In addition, the transistors N11 and N13 function as a current mirror that generates a mirror current I3 according to the constant current I1. Further, the transistors P13 and P14 function as a current mirror that generates a charging current I4 according to the mirror current I3. In this way, the transistors N11 and N13, the transistor P11, the transistors P13 and P14, and the resistor R11 function as a charging part that charges the capacitor C11.

In addition, the transistor N14 functions as a discharging part that discharges the capacitor C11 according to the reverse current detection level switching signal S3. More specifically, the transistor N14 is turned on when the reverse current detection level switching signal S3 is at the high level and short-circuits the both ends of the capacitor C11 to discharge the charges stored in the capacitor C11.

In the transistor N18 and the resistor R12, a variable current I5 (≈VC/R12) corresponding to the charging voltage VC of the capacitor C11 is generated. In the transistors N15 and N16, a slope current I6 corresponding to the variable current I5 is generated. That is to say, the transistors N15 and N16, the transistor N18, and the resistor R12 function as a voltage-current conversion part that generates the slope current I6 according to the charging voltage VC of the capacitor C11.

In addition, the resistor R13 and the capacitor C12 function as a current-voltage conversion part that generates the reverse current detection voltage Vth (≈VON−I6×R13) from the slope current I6.

In addition, the transistors N11 and N12 function as a current mirror that generates the mirror current I2 according to the constant current I1. In addition, the transistors P16 and P17 function as a current mirror that generates a drive current I7 according to the mirror current I2. That is to say, the transistors N11 and N13 and the transistors P16 and P17 function as a drive current source that generates the drive current I7 of the comparator CMP.

The comparator CMP compares the reverse current detection voltage Vth input to the non-inverting input terminal (+) with the sense voltage Vcs input to the inverting input terminal (−) to generate a reverse current detection signal Sdet. The reverse current detection signal Sdet has a low level (a logic level at the time of non-detection of reverse current) when the sense voltage Vcs is higher than the reverse current detection voltage Vth, and has a high level (a logic level at the time of detection of reverse current) when the sense voltage Vcs is lower than the reverse current detection voltage Vth. The upper power supply terminal and lower power supply terminal of the comparator CMP are connected to the second power supply terminal VON and a third power supply terminal CLP, respectively. Therefore, the high level of the reverse current detection signal Sdet becomes VON and the low level of the reverse current detection signal Sdet becomes CLP (=Von−α).

The level shifter LS level-shifts the reverse current detection signal Sdet to generate the turning-off timing signal Soff. The upper power supply terminal and lower power supply terminal of the input stage of the level shifter LS are connected to the second power supply terminal VON and the third power supply terminal CLP, respectively. On the other hand, the upper power supply terminal and lower power supply terminal of the output stage of the level shifter LS are connected to the first power supply terminal PVCC and the ground terminal AGND, respectively. Therefore, the high level of the turning-off timing signal Soff becomes PVCC and the low level of the turning-off timing signal Soff becomes AGND.

Next, the operation of the reverse current detection part 130 having the above configuration will be described in detail with reference to FIG. 9, together with FIG. 8 described above.

Figure 9:
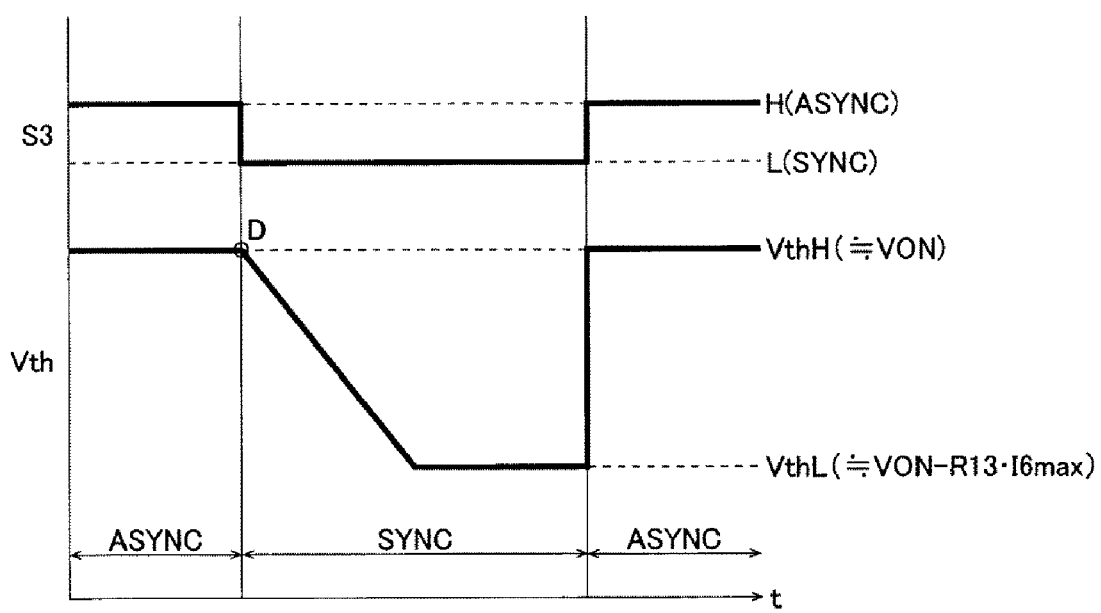
FIG. 9 is a schematic view showing behaviors of a reverse current detection level switching signal and a reverse current detection voltage.

FIG. 9 is a schematic diagram showing behaviors of the reverse current detection level switching signal S3 and the reverse current detection voltage Vth. When the reverse current detection level switching signal S3 is at the high level, the transistor N14 is turned on so that the capacitor C11 is discharged. Accordingly, the charging voltage VC becomes zero and the transistor N18 is turned off so that the variable current I5 does not flow. As a result, since the slope current I6 does not flow through the resistor R13, the overcurrent detection voltage Vth becomes the first voltage value VthH (≈VON) which is the maximum value.

On the other hand, when the reverse current detection level switching signal S3 falls from the high level to the low level, the transistor N14 is turned off so that the capacitor C11 is charged by the charging current I4. Therefore, the variable current I5 increases with the rise of the charge voltage VC. As a result, the slope current I6 flowing through the resistor R13 also gradually increases so that the over-current detection voltage Vth gradually decreases and finally reaches the second voltage value VthL (≈VON−R13×I6max).

Thereafter, when the reverse current detection level switching signal S3 rises again to the high level, the charging voltage VC quickly returns to zero so that the overcurrent detection voltage Vth is also steeply pulled up to the first voltage value VthH. This behavior can be said to correspond to FIG. 2 described above. On the other hand, if it is desired to gradually raise the overcurrent detection voltage Vth from the second voltage value VthL to the first voltage value VthH correspondingly to FIG. 7 described above, the capacitor C11 may be discharged not instantaneously but smoothly.

Figure 10:
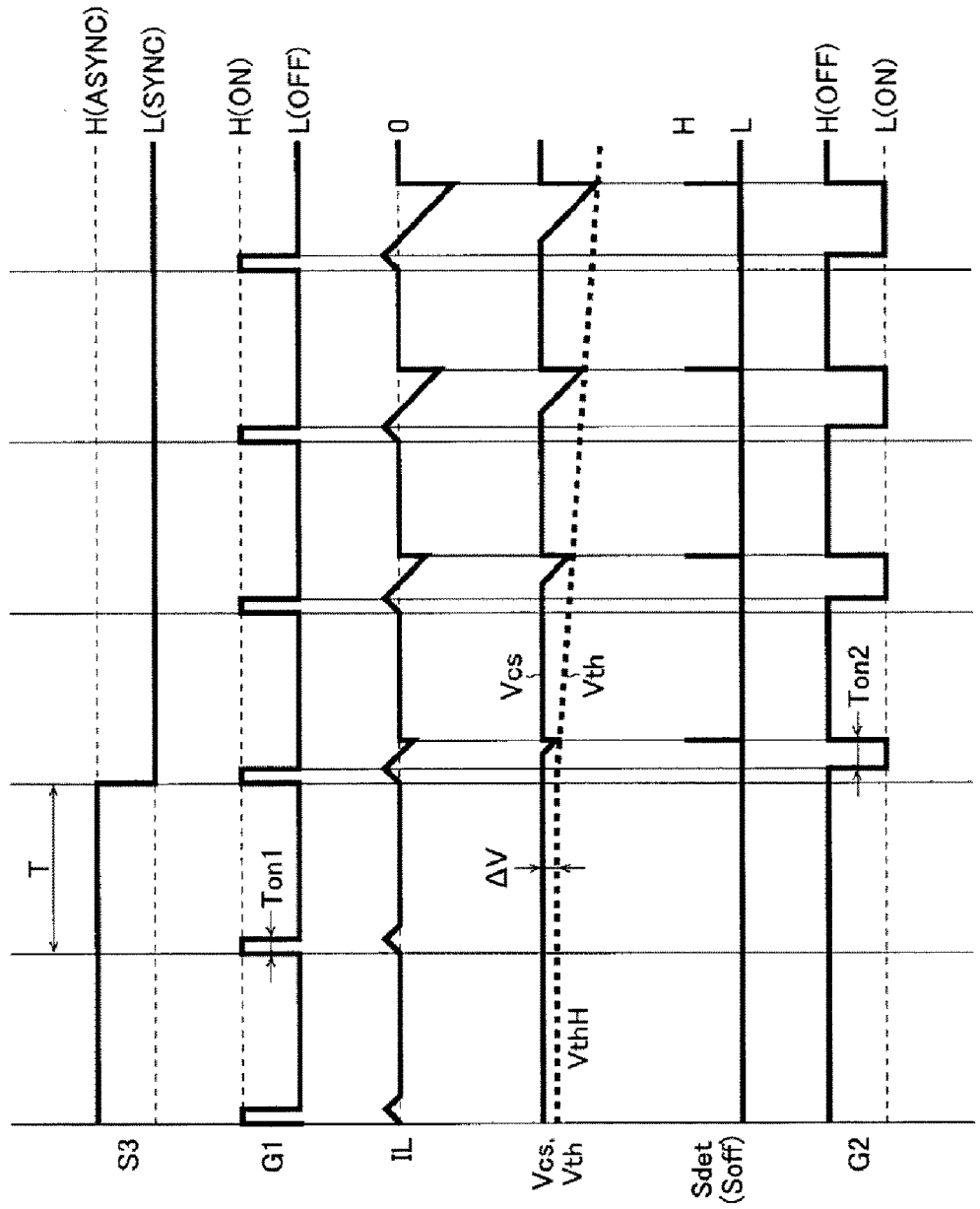
FIG. 10 is a timing chart (point D) showing an example of a reverse current detection operation.

FIG. 10 is a timing chart showing an example of the reverse current detecting operation at point D (a point in time before and after falling of the reverse current detection level switching signal S3) in FIG. 9, depicting the reverse current detection level switching signal S3, the gate signal G1, the inductor current IL, the sense voltage Vcs (indicated by a solid line), the reverse current detection voltage Vth (indicated by a broken line), the reverse current detection signal Sdet (the turning-off timing signal Soff), and the gate signal G2 in the descending order.

In FIG. 10, in order to clearly show how the turning-on period Ton2 of the transistor M2 gradually becomes to be long, the behavior of change of the reverse current detection voltage Vth is depicted in a considerably drastic manner. Actually, however, it decreases more slowly over time than the depiction in FIG. 10.

When the reverse current detection level switching signal S3 is at the high level, the overcurrent detection voltage Vth is set to the highest first voltage value VthH. On the other hand, when a voltage value higher than the first voltage value VthH by an offset value $\Delta V$ is set as a reference value, the sense voltage Vcs is set to decrease from the reference value by the amount of a negative inductor current IL (the reverse current Irev). Therefore, as long as the negative inductor current IL (the reverse current Irev) does not flow, the reverse current detection signal Sdet will not rise to the high level.

Thereafter, when the reverse current detection level switching signal S3 falls to the low level in accordance with a switching timing from the asynchronous mode (ASYNC) to the synchronous mode (SYNC), the reverse current detection voltage Vth is gradually lowered from this point of time. As a result, since the cross point between the sense voltage Vcs and the reverse current detection voltage Vth is delayed, the turning-on period Ton2 of the transistor M2 gradually becomes longer.

With this operation, in the synchronous mode (SYNC), since the reverse current detection level can be initially kept low and gradually increased over time, it is possible to use the reverse current detection function to limit the sink current capability.

FIGS. 8 to 10 illustrate the configuration in which only the switching timing of the reverse current detection voltage Vth is set using the reverse current detection level switching signal S3 and the reverse current detection voltage Vth is changed in an analog manner in the reverse current detection part 130. However, the method of switching the reverse current detection level is not limited thereto. For example, when the reverse current detection level switching signal S3 is a multi-level digital signal and is converted into an analog reverse current detection voltage Vth in the reverse current detection part 130, the logic circuit 300 can be used as the subject to control the reverse current detection level.

<Feedback Control Part>

Figure 11:
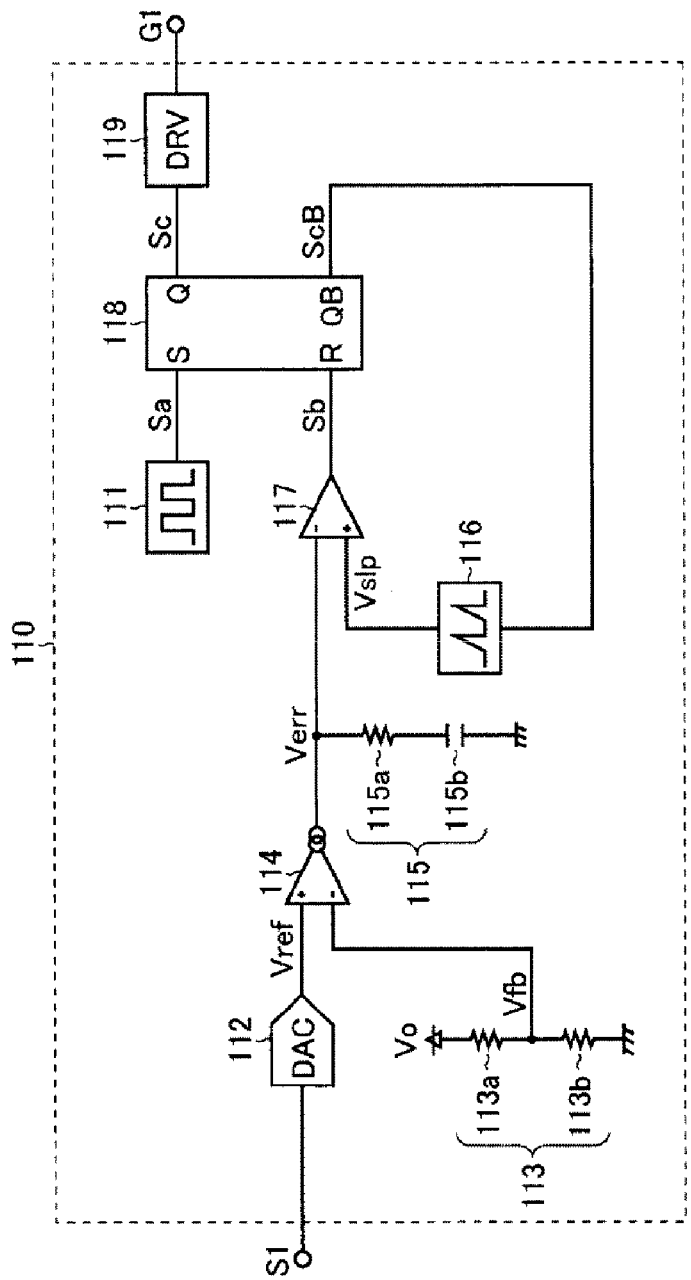
FIG. 11 is a circuit block diagram showing a configuration example of a feedback control part.

FIG. 11 is a circuit block diagram showing a configuration example of the feedback control part 110. The feedback control part 110 of this configuration example includes a clock signal generation part 111, a digital/analog conversion part 112, a feedback voltage generation part 113, an error amplifier 114, a phase compensation part 115, a slope voltage generation part 116, a comparator 117, an RS flip-flop 118, and a driver 119.

The clock signal generation part 111 generates a clock signal at a predetermined switching frequency f (=1/T) and outputs it as a set signal Sa to the RS flip-flop 118.

The digital/analog conversion unit 112 generates an analog reference voltage Vref from the digital reference voltage setting signal S1.

The feedback voltage generation part 113 includes resistors 113a and 113b (resistance values: Ra and Rb) connected in series between the output terminal of the output voltage Vo and the ground terminal and outputs a feedback voltage Vfb (={Rb/(Ra+Rb)}×Vo), which is obtained by dividing the voltage Vo, from a connection node between the resistor 113a and the resistor 113b. However, when the output voltage Vo is within an input dynamic range of the feedback control part 110, the feedback voltage generation part 113 may be omitted and the output voltage Vo may be directly received as the feedback voltage Vfb.

The error amplifier 114 is a current output type transconductance amplifier (a so-called gm amplifier). In accordance with a difference between the feedback voltage Vfb input to the inverting input terminal (−) and the reference voltage Vref input to the non-inverting input terminal (+), the error amplifier 114 generates an error voltage Verr by charging/discharging a capacitor 115b forming the phase compensation part 115. When the feedback voltage Vfb is lower than the reference voltage Vref, a current flows from the error amplifier 114 toward the capacitor 115b so that the error voltage Verr rises. Conversely, when the feedback voltage Vfb is higher than the reference voltage Vref, a current is drawn from the capacitor 115b toward the error amplifier 114 so that the error voltage Verr lowers.

The phase compensation part 115 is a time constant circuit including a resistor 115a and the capacitor 115b connected in series between the output terminal of the error amplifier 114 and the ground terminal, and compensates the phase of the error voltage Verr so as to prevent oscillation of the feedback control part 110.

The slope voltage generation part 116 generates a slope voltage Vslp synchronized with the turning-on/off control of the transistor M1 (the inverted pulse width modulation signal ScB in FIG. 11). The slope voltage Vslp is a sawtooth-shaped analog voltage which starts to rise at the turning-on timing of the transistor M1 and is reset to a zero value at the turning-off timing of the transistor M1.

The comparator 117 compares the error voltage Verr input to the inverting input terminal (−) with the slope voltage Vslp input to the non-inverting input terminal (+) to generate a comparison signal, and outputs it as a reset signal Sb to the RS flip-flop 118. The reset signal Sb has a low level when the error voltage Verr is higher than the slope voltage Vslp, and has a high level when the error voltage Verr is lower than the slope voltage Vslp.

The RS flip-flop 118 outputs a pulse width modulation signal Sc from the output terminal (Q) according to the set signal Sa input to a set terminal (S) and the reset signal Sb input to a reset terminal (R). The pulse width modulation signal Sc is set to a high level at the rising edge of the set signal Sa and is reset to a low level at the rising edge of the reset signal Sb. However, when the set signal Sa and the reset signal Sb are at a high level at the same time, the reset signal Sb has a priority. The RS flip-flop 118 simultaneously outputs the inverted pulse width modulation signal ScB (an inverted logic signal of the pulse width modulation signal Sc) from an inverted output terminal (QB).

The driver 119 receives the pulse width modulation signal Sc, boosts its current capability to thereby generate the gate signal G1 of the transistor M1, and outputs the generated gate signal G1 to the gate of the transistor M1.

In FIG. 11, the circuit configuration for generating the gate signal G1 by the voltage mode control is taken as an example in the feedback control part 110. However, the output feedback control method is not limited thereto but may employ current mode control or hysteresis control (on-time fixing method, etc.).

<Modifications>

Figure 12:
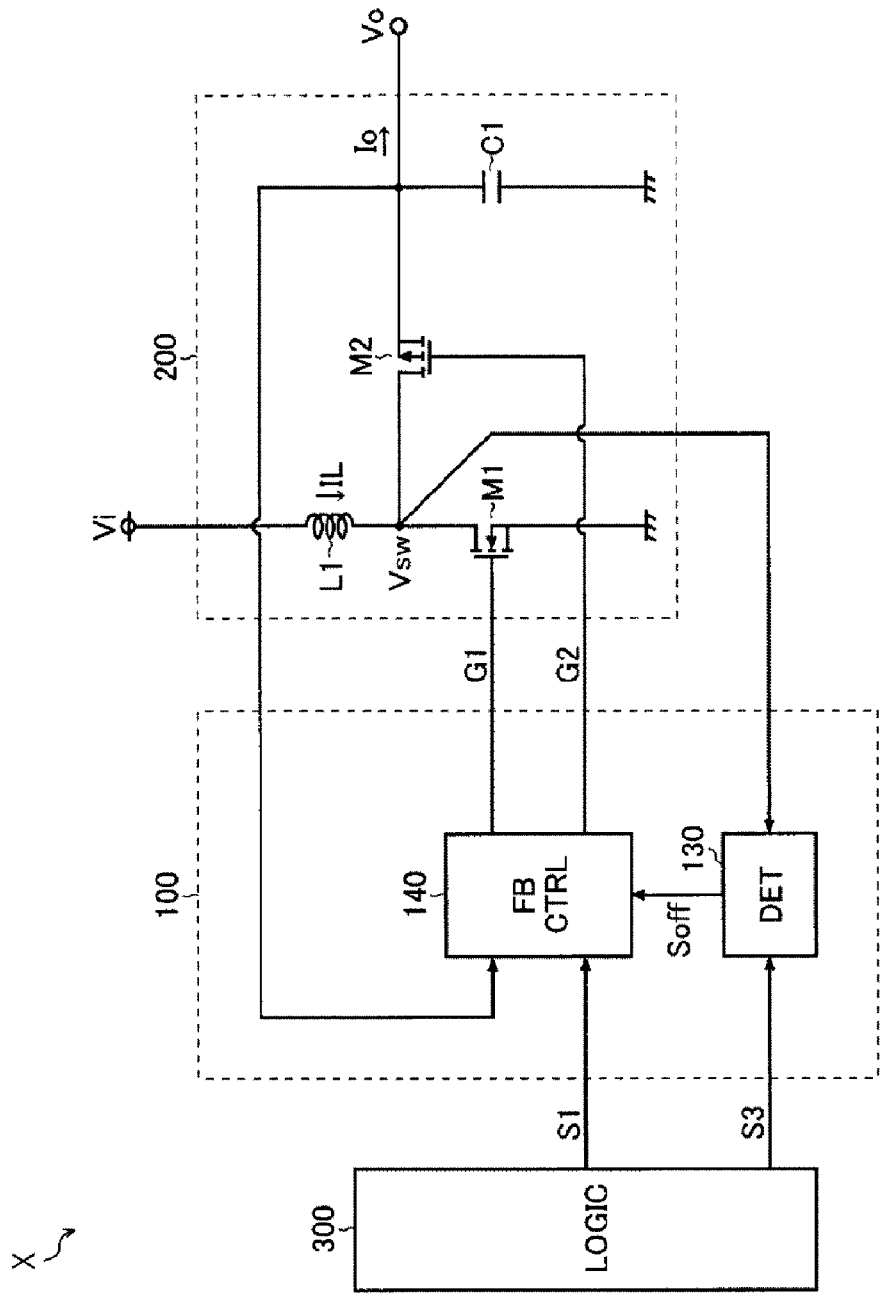
FIG. 12 is a circuit block diagram showing a first modification of the switching power supply device.

FIG. 12 is a circuit block diagram showing a first modification of the switching power supply device 1. A switching power supply device X of this modification has several changes made based on FIG. 1. The first change is to eliminate the diode D1 and fix the switching output circuit 200 to a synchronous rectification mode. The second change is to input a switch voltage Vsw instead of the sense voltage Vcs to the reverse current detection part 130. The same elements as those described above are denoted by the same reference numerals as those in FIG. 1 and explanation of which will not be repeated. In the following, the above-mentioned changes will be mainly described.

Unlike the feedback control part 110 in FIG. 1, a feedback control part 140 turns on/off the transistors M1 and M2 in a complementary manner so that the output voltage Vo becomes the target value. In addition, like the feedback control part 110 in FIG. 1, the feedback control part 140 receives the turning-off timing signal Soff (the reverse current detection signal) from the reverse current detection part 130 and has a light load mode in which the transistor M2 is forcibly turned off when a reverse current flowing during the turning-on period of the transistor M2 reaches the reverse current detection level.

The reverse current detection part 130 compares the switch voltage Vsw appearing on the connection node between the transistors M1 and M2 with a predetermined reverse current detection voltage during the turning-on period of the transistor M2 to detect whether or not a reverse current flowing through the transistor M2 reaches the reverse current detection level. When the feedback control part 110 is switched from the light load mode to a mode for turning on/off the transistors M1 and M2 in a complementary manner, for example, when the target value of the output voltage Vo is lowered, the reverse current detection level is gradually raised from the first level to the second level. This point has no difference from the explanation made so far. In addition, similarly to FIG. 1, the reverse current detection part 130 may be configured to receive the sense voltage Vcs.

As shown in this modification, the configuration for gradually reducing the output voltage Vo while limiting the sink current capability by using the reverse current detection function can be applied to a case where the step-up type switching output circuit 200 is driven by a synchronous rectification system having a light load mode.

Figure 13:
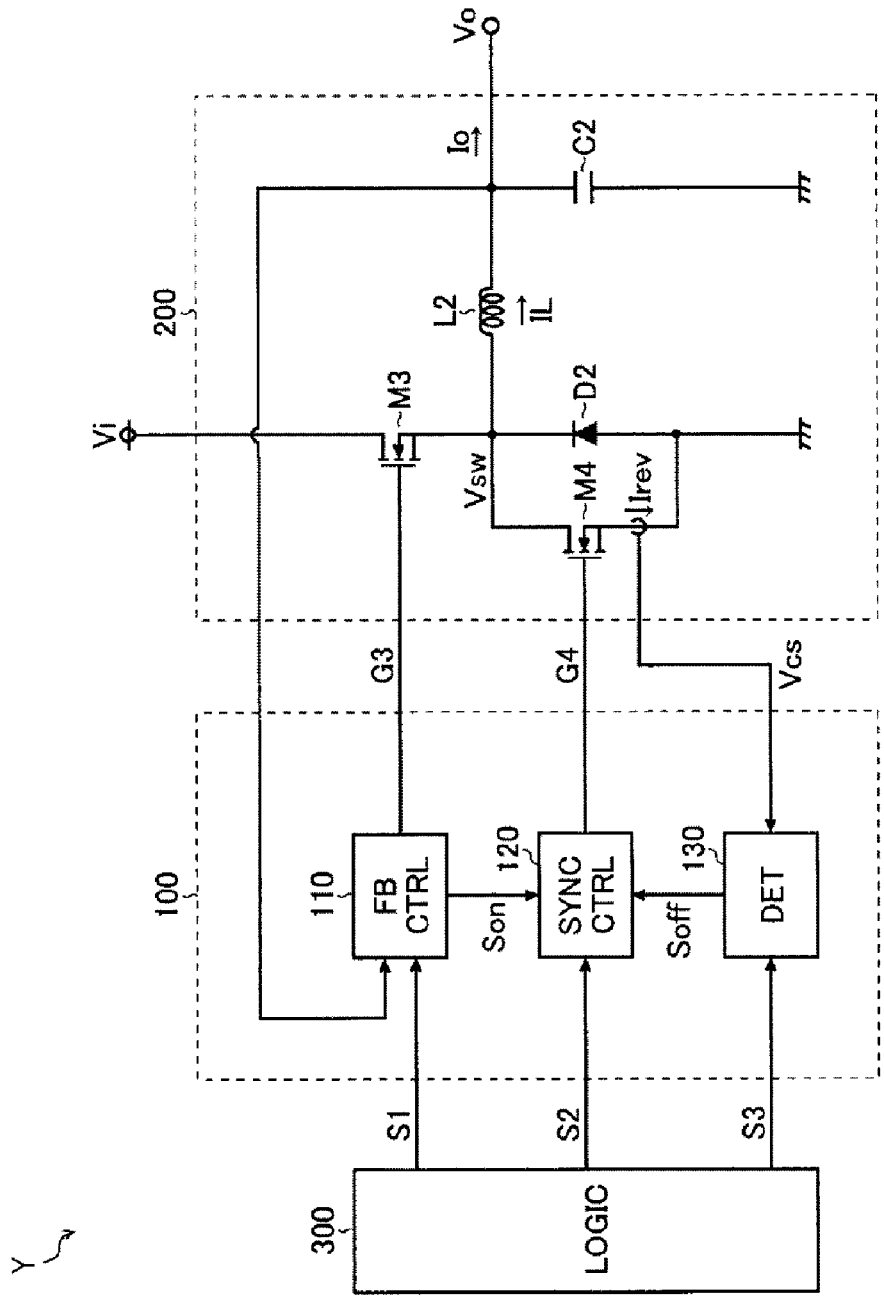
FIG. 13 is a circuit block diagram showing a second modification of the switching power supply device.

FIG. 13 is a circuit block diagram showing a second modification of the switching power supply device 1. In a switching power supply device Y of this modification, the switching output circuit 200 is based on FIG. 1 but is changed from a step-up type to a step-down type. The same elements as those described above are denoted by the same reference numerals as those in FIG. 1 and explanation of which will not be repeated. In the following, the above-mentioned change will be mainly described.

In this modification, the switching output circuit 200 is a step-down type switching output stage that generates the output voltage Vo from an input voltage Vi and supplies it to a load (not shown), and includes an N-channel type MOS field effect transistor M3 (corresponding to an output switch element), an N-channel type MOS field effect transistor M4 (corresponding to a synchronous rectification element), a diode D2 (corresponding to an asynchronous rectification element), an inductor L2, and an output capacitor C2.

The drain of the transistor M3 is connected to the input terminal of the input voltage Vi. The source and back gate of the transistor M3, the drain of the transistor M4, and the cathode of the diode D2 are all connected to the first end of the inductor L2. A gate signal G3 is input to the gate of the transistor M3. The source and back gate of the transistor M4 and the anode of the diode D2 are connected to the ground terminal. A gate signal G4 is input to the gate of the transistor M4. The second end of the inductor L2 is connected to the output terminal of the output voltage Vo. The output capacitor C2 is connected between the output terminal of the output voltage Vo and the ground terminal.

The transistors M3 and M4 are respectively turned on when the gate signals G3 and G4 are at a high level, and are respectively turned off when the gate signals G3 and G4 are at a low level. These transistors M3 and M4 may be integrated in a semiconductor device, together with the switching control circuit 100, or may be externally attached to the semiconductor device as discrete components.

In this way, the switching output circuit 200 of this modification includes the diode D2 and the transistor M4 connected in parallel as its rectifying elements, and is controlled to be driven in one of the asynchronous mode and the synchronous mode described above.

The feedback control part 110 generates the gate signal G3 so that the output voltage Vo becomes the target value, and turns on/off the transistor M3. More specifically, the feedback control part 110 generates the gate signal G3 so that the output voltage Vo (or the corresponding feedback voltage Vfb) becomes the reference voltage Vref.

The synchronous control part 120 is switched to one of the asynchronous mode and the synchronous mode according to the mode switching signal S2 input from the logic circuit 300. The asynchronous mode is an operation mode in which the transistor M4 is always turned off regardless of whether the transistor M3 is turned on or off. On the other hand, the synchronous mode is an operation mode in which the transistor M4 is turned on when the transistor M3 is turned off, and is turned off when the reverse current Irev flowing during the turning-on period of the transistor M4 reaches a predetermined reverse current detection level.

During the turning-on period of the transistor M4, the reverse current detection part 130 compares the sense voltage Vcs obtained by current-voltage conversion of the reverse current Irev with the reverse current detection voltage Vth to thereby detect whether or not the reverse current Irev reaches the reverse current detection level, and generates the turning-off timing signal Soff (a reverse current detection signal) based on a result of the detection.

As shown in this modification, the configuration for gradually reducing the output voltage Vo while limiting the sink current capability by using the reverse current detection function can be applied to a case where the step-down type switching output circuit 200 is driven by an asynchronous rectification system.

Figure 14:
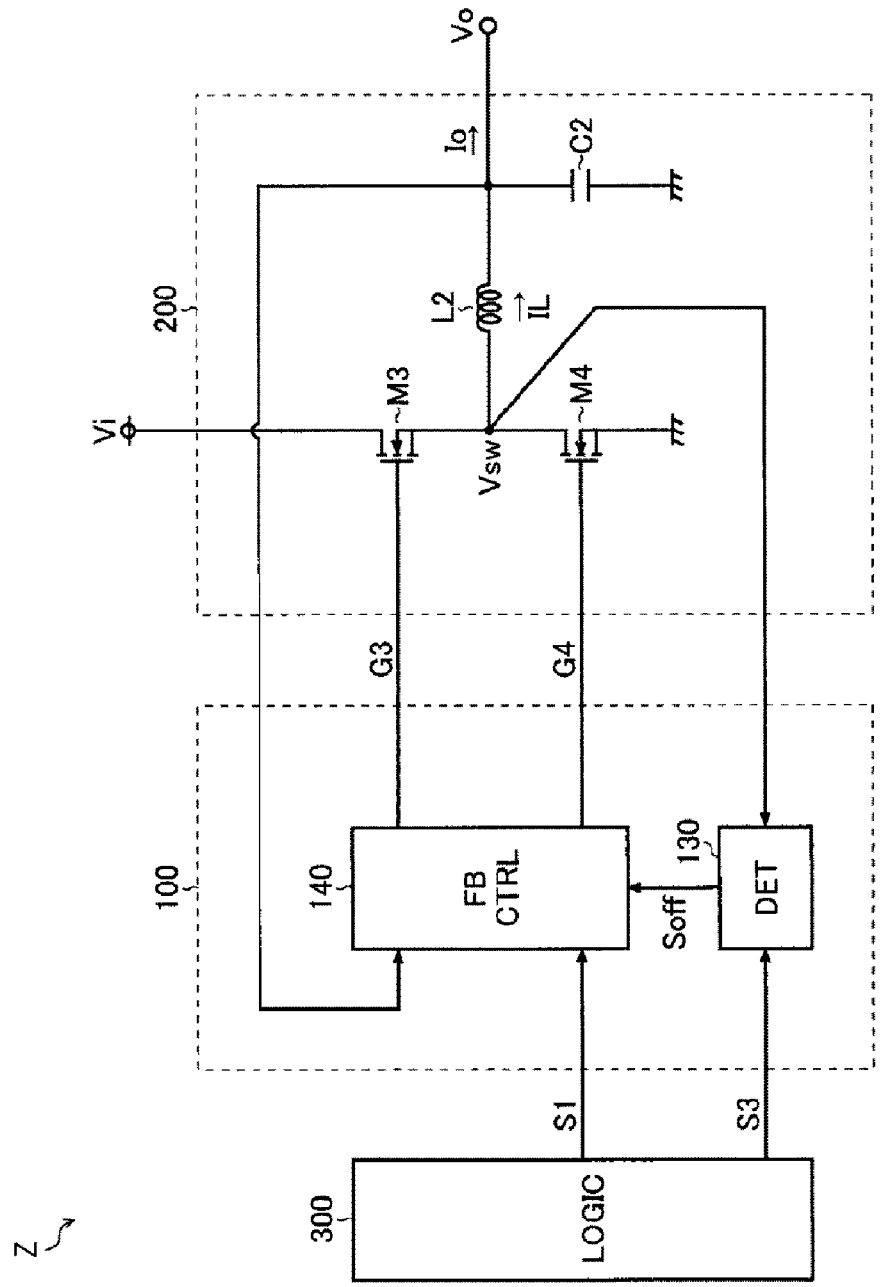
FIG. 14 is a circuit block diagram showing a third modification of the switching power supply device.
Figure 15:
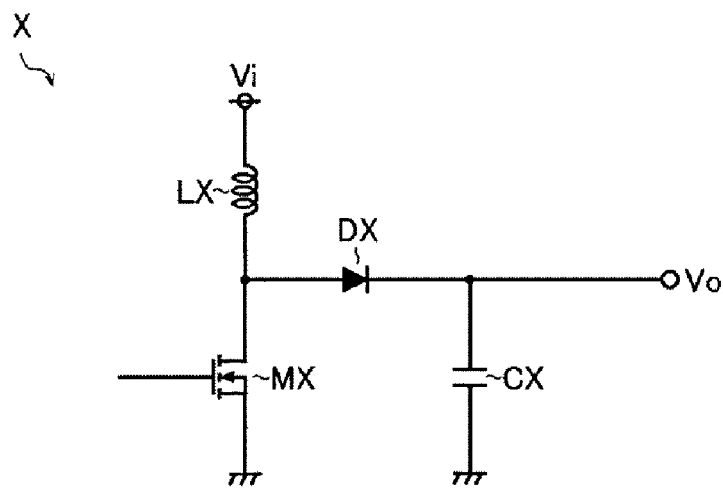
FIG. 15 is a circuit block diagram showing a conventional switching power supply device.
Figure 16:
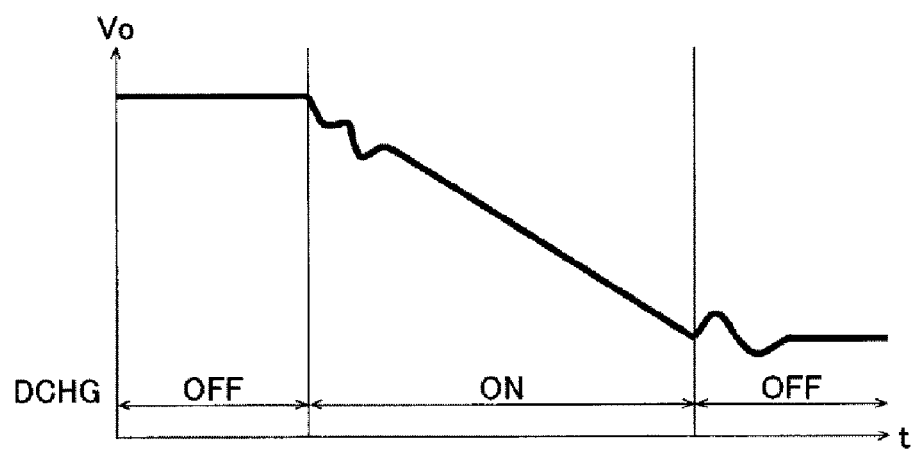
FIG. 16 is a conventional output waveform diagram.

FIG. 14 is a circuit block diagram showing a third modification of the switching power supply device 1. A switching power supply device Z of this modification has several changes made based on FIG. 13. The first change is to eliminate the diode D2 and fix the switching output circuit 200 to a synchronous rectification mode. The second change is to input a switch voltage Vsw instead of the sense voltage Vcs to the reverse current detection part 130. The same elements as those described above are denoted by the same reference numerals as those in FIG. 13 and explanation of which will not be repeated. In the following, the above-mentioned changes will be mainly described.

Unlike the feedback control part 110 in FIG. 13, a feedback control part 140 turns on/off the transistors M3 and M4 in a complementary manner so that the output voltage Vo becomes the target value. In addition, like the feedback control part 110 in FIG. 13, the feedback control part 140 receives the turning-off timing signal Soff (the reverse current detection signal) from the reverse current detection part 130 and has a light load mode in which the transistor M4 is forcibly turned off when a reverse current flowing during the turning-on period of the transistor M4 reaches the reverse current detection level.

The reverse current detection part 130 compares the switch voltage Vsw appearing on the connection node between the transistors M3 and M4 with a predetermined reverse current detection voltage during the turning-on period of the transistor M4 to detect whether or not a reverse current flowing through the transistor M4 reaches the reverse current detection level. When the feedback control part 110 is switched from the light load mode to a mode for turning on/off the transistors M3 and M4 in a complementary manner, for example, when the target value of the output voltage Vo is lowered, the reverse current detection level is gradually raised from the first level to the second level. This point has no difference from the explanation made so far. In addition, similarly to FIG. 13, the reverse current detection part 130 may be configured to receive the sense voltage Vcs.

As shown in this modification, the configuration for gradually reducing the output voltage Vo while limiting the sink current capability by using the reverse current detection function can be applied to a case where the step-down type switching output circuit 200 is driven by a synchronous rectification system having a light load mode.

Further, although not shown, the switching output circuit 200 is not limited to the step-up type (FIGS. 1 and 12) and the step-down type (FIGS. 13 and 14) but may be a step-up/step-down type.

<Other Modifications>

In addition to the above embodiments, various technical features disclosed in this specification can be modified in various ways without departing from the spirit and scope of the present disclosure. For example, the mutual substitution between a MOS field effect transistor and a bipolar transistor and the inversion of logic levels of various signals are optional. That is to say, the above embodiments are illustrative in all respects and should not be considered limitative. The technical scope of the present disclosure is not the description of the above embodiments and is to be understood to encompass all changes belonging to the meanings and scope equivalent to the claims.

The present disclosure can be applied to all switching power supply devices used as power supply devices for various applications.

According to the present disclosure in some embodiments, it is possible to provide a switching control circuit capable of obtaining the sink current capability without requiring a separate discharging circuit, a switching power supply device and an electronic apparatus including the same.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A switching control circuit comprising:
    a feedback control part configured to turn on and turn off an output switch element of a switching output circuit so that an output voltage of the switching output circuit becomes a target value;
    a synchronous control part configured to turn on and turn off a synchronous rectification element connected in parallel to an asynchronous rectification element of the switching output circuit; and
    a reverse current detection part configured to detect whether or not a reverse current flowing during a turning-on period of the synchronous rectification element reaches a predetermined reverse current detection level,
    wherein the synchronous control part has operation modes including:
        an asynchronous mode in which the synchronous rectification element is always turned off; and
        a synchronous mode in which the synchronous rectification element is turned on when the output switch element is turned off, and is turned off when the reverse current reaches the reverse current detection level, and
    wherein the reverse current detection level is gradually raised from a first level to a second level when the synchronous control part is switched from the asynchronous mode to the synchronous mode.

2. The switching control circuit of claim 1, wherein after the reverse current detection level is raised to the second level, the reverse current detection level is gradually lowered from the second level to the first level.

3. The switching control circuit of claim 1, wherein after the reverse current detection level is raised to the second level, the reverse current detection level is rapidly lowered from the second level to the first level.

4. The switching control circuit of claim 1, wherein the reverse current detection part determines whether or not the reverse current reaches the reverse current detection level by comparing one of a sense voltage, which is obtained by a current-voltage conversion of the reverse current during the turning-on period of the synchronous rectification element, and a switch voltage appearing on a connection node between the output switch element and the synchronous rectification element with a predetermined reverse current detection voltage.

5. The switching control circuit of claim 4, wherein the reverse current detection part includes:
    a capacitor;
    a charging part that charges the capacitor;
    a discharging part that discharges the capacitor;
    a voltage/current conversion part that generates a slope current from a charging voltage of the capacitor;
    a current/voltage conversion part that generates the reverse current detection voltage from the slope current; and
    a comparator that compares the sense voltage or the switch voltage with the reverse current detection voltage to generate a reverse current detection signal.

6. The switching control circuit of claim 1, wherein the feedback control part controls driving of the switching output circuit by a voltage mode control, current mode control, or hysteresis control.

7. A switching power supply device comprising:
    a switching output circuit configured to generate an output voltage from an input voltage;
    a switching control circuit of claim 1, which is configured to control driving of the switching output circuit; and
    a logic circuit configured to output a signal for setting a target value of the output voltage to the switching control circuit.

8. The switching power supply device of claim 7, wherein the switching output circuit is of a step-up type, a step-down type, or a step-up/step-down type.

9. An electronic apparatus comprising:
   a switching power supply device of claim 7; and
   a load configured to be operated with a power supplied from the switching power supply device.

\* \* \* \* \*